United States Patent

Trötscher et al.

[11] 4,370,058
[45] Jan. 25, 1983

[54] DIGITAL FOCIMETER AND METHOD

[75] Inventors: Otto Trötscher; Horst Stacklies, both of Aalen; Meinrad Mächler, Ellwangen, all of Fed. Rep. of Germany

[73] Assignee: Carl Zeiss-Stiftung, Oberkochen, Fed. Rep. of Germany

[21] Appl. No.: 173,377

[22] Filed: Jul. 29, 1980

[30] Foreign Application Priority Data

Aug. 24, 1979 [DE]  Fed. Rep. of Germany ....... 2934263

[51] Int. Cl.³ .............................................. G01B 9/00
[52] U.S. Cl. ................................................. 356/125
[58] Field of Search ................................ 356/124–127

[56] References Cited

U.S. PATENT DOCUMENTS

| | | | |
|---|---|---|---|
| 4,007,990 | 2/1977 | McDevitt, Jr. et al. | 356/124 |
| 4,102,575 | 7/1978 | Lapornik et al. | 356/125 |
| 4,139,305 | 2/1979 | Lapornik | 356/125 |
| 4,275,964 | 6/1981 | Vassiliadis | 356/127 |

FOREIGN PATENT DOCUMENTS 1125680  3/1962  Fed. Rep. of Germany .

*Primary Examiner*—Bruce Y. Arnold

*Attorney, Agent, or Firm*—Hopgood, Calimafde, Kalil, Blaustein & Judlowe

[57] ABSTRACT

The invention contemplates a method and apparatus for automatically performing digital measurement of vertex dioptric powers in the principal planes of toric spectacle lenses. A spectacle lens is transilluminated by a parallel-ray bundle of monochromatic light which, after passage through the spectacle lens, is limited by an annular stop in the immediate vicinity of the vertex of the spectacle lens. A beamsplitter divides the light which passes through the spectacle lens into two individual light beams. As a result, an elliptical figure is projected to two planes, in each of which is located at least one self-scanning diode line. Diode-line scanning develops intercepts of the projected elliptical figure, and from the positional locations of these intercepts (in relation to the local intercept of the optical axis) a computer performs a selected one of a plurality of evaluation procedures (a) to develop projected-figure reorientation or displacement as necessary to permit it then (b) to perform a desired measurement evaluation. Provision is made for automatic detection of whether a given spectacle lens is or is not within the currently set range of measurement capability and, if determined to be outside such range, the fact of such detection is operative to change optical elements of the apparatus for optimum measurement-range accommodation of the particular spectacle lens.

13 Claims, 6 Drawing Figures

DIGITAL FOCIMETER AND METHOD

BACKGROUND OF THE INVENTION

This invention relates to a method for the automatic digital measurement of vertex dioptric power.

Methods are already known for the analog measurement of vertex power in which the refractive power of spectacle lenses is measured, generally semi-automatically, by operating personnel. The work of such personnel includes, among other things, the centering of the spectacle lenses and the reading of measurement value. Should the measurement value lie outside of predetermined tolerances, the lens in question is sorted out by the operator.

From West German Pat. No. 1,125,680, a measurement device is known with which vertex dioptric powers can also be measured. In using said measurement device, the lens to be tested is placed in the parallel-ray path of an optical system, and one measures the consequent displacement of the focal plane in the direction of the optical axis; the vertex refractive powers can be calculated from this measurement. A detector placed in said plane continuously tracks the focal plane; its signals serve for the automatic centering of the object being tested.

The method of the known device employs chopped light and requires, in addition to the drives for the centering movement, an accurately operating tracking control which retains the detector in the focal plane. The measurement of toric lenses requires the detector to be positioned into two focal planes, in the course of rotating the object being examined. Thus, the known method requires a large amount of apparatus and consumption of time.

BRIEF STATEMENT OF THE INVENTION

The object of the present invention is to provide an improved method of measuring vertex dioptric power, whereby a highly accurate, rapid and objective determination of measurement values is made at relatively small expense.

The invention achieves this object in the manner that the spectacle lens to be measured is transilluminated with a bundle of monochromatic parallel rays, that the light bundle which passes through the spectacle lens is limited by a stop in the immediate vicinity of the vertex of the spectacle lens, the light which passes the stop being directed to a scanning plane which contains at least one self-scanning photo-diode line, and that signals developed by the diode line are used to obtain the digital measurement value.

More specifically, in the inventive method, the dimensions of a projected figure are measured digitally and, therefore, in an easily processible manner; from the size of the projected figure, and knowing the geometry of the arrangement, the vertex dioptric powers can be accurately calculated. The advantage of the invention resides in the fact that it provides an automatic process for the measurement of vertex dioptric power, which process lends itself to use of only a few commercially available assemblies. In particular, it is unnecessary to focus the image plane on the detector since the stop, which is localized in the vertex of the object being examined (in the further context of near-zero effective aperture of the laser-beam bundle), results in a projected-figure depth of focus which approaches infinity. The high sensitivity of the diode line used permits rapid development of the measurement value, even with small output powers of the source of monochromatic radiation.

In one advantageous embodiment, the method is carried out with two diode lines arranged crosswise, with their alignments normal to the optical axis and effectively intersecting on the optical axis. The use of such an arrangement makes possible, in simple fashion, an automatic centering of the object being examined in both directions and a simultaneous determination of refractive powers in the principal planes of toric lenses.

By the providing for a relative rotational displacement, as between the spectacle lens and the diode lines, a further advantage is obtained, in that the lenses do not have to be inserted with particular orientation (azimuthally) along their principal planes, since the projected figure coincides twice per passage with the diode lines (i.e., has two intercepts with each of the diode lines). Vertex refractive powers therefore result as the extreme values of the measurement values, which are dependent on the rotational position.

A digital focimeter which operates in accordance with the method of the invention employs a laser as the source of light. Light from the laser is directed through a beam expander which produces an expanded bundle of parallel rays. A spectacle lens to be measured is arranged with its eye-side vertex on an annular stop in the parallel-ray path of the expanded bundle. A beam-splitter prism is arranged in the path of light passing through the spectacle lens and through the stop, and each of the diodes lines is disposed across a different one of the light-exit surfaces of the beam-splitter prism.

The laser supplies a monochromatic parallel-ray beam which is adapted, by a simple expansion-optical system, to the dimensions of the object being examined and to the dimensions of the stop and of the diode lines. Since diffraction phenomena by slits are symmetrical, the distances between the centroids of the light distribution in the projection of the ring slit used here on the diode lines are independent of refraction and thus of intensity. By means of the beam-splitter prism a crosswise arrangement of the diode lines is obtained, effectively in a single plane but without requiring that the diode lines physically lie in the same plane.

It is advantageous to arrange the beam-splitter prism and the diode lines fixed with respect to each other but bodily rotatable about the optical axis; and, to mount he observed object on a stage which is displaceable in two directions perpendicular to the optical axis and is controlled, for instance, by motor drive by means of centering signals which are derived from the diode lines. Various procedures will be described by which these centering signals can be developed from asymmetries of the light-dark signals of the diode lines, at their respective intercepts with the projected-light figure.

Furthermore, it is advisable to provide an indication of the possible circumstance that an inserted spectacle lens is of such power as to exceed the measurement range, since such circumstance could lead to false measurement results. For example, by means of a suitable connection of the outermost diodes of the lines, a computer can be enabled to recognize that the measurement range has been exceeded in the direction towards high negative diopters of the object being examined.

Recognition that the measurement range has been exceeded in the direction towards positive diopters can be effected unambiguously in the following manner: A supplementary lens is arranged in the ray path on one light-exit side of the beam-splitter prism, thereby creating a constant size difference as between the doubly projected figures. This size difference will introduce a scale-effect error in figure-intercept identification via one versus the other of the diode lines, but such error, being constant, may be eliminated by electronic circuits in the signal branch of one of the two diodes lines. In the circumstance of an inserted spectacle lens of such power as to exceed the measurement range, with resultant reversal of the position of the focal point of the bundle of rays relative to the plane of the diode lines, the optically and electronically produced differences now add to each other, rather than compensate for each other, and they produce a signal which serves to indicate that the measurement range has been exceeded in the direction toward positive diopters.

The excess-diopters signals can also be used to swing one or more supplementary optical systems into the ray path between the object being examined and the beam-splitter prism, whereby a change in the measurement range is obtained.

It has also been found advantageous to provide a prism compensator which offsets or neutralizes such prismatic effects of the object being examined as might otherwise prevent projected-figure centering independent of the instantaneous rotational orientation of the object. Such a prism compensator may comprise two wedges which are rotatable in opposite directions about the optical axis and with which the prismatic effect of the object being examined can not only be compensated, but can also be measured.

DETAILED DESCRIPTION

The invention will be illustratively described in detail, in conjunction with the accompanying drawings, in which.

Figure 1:
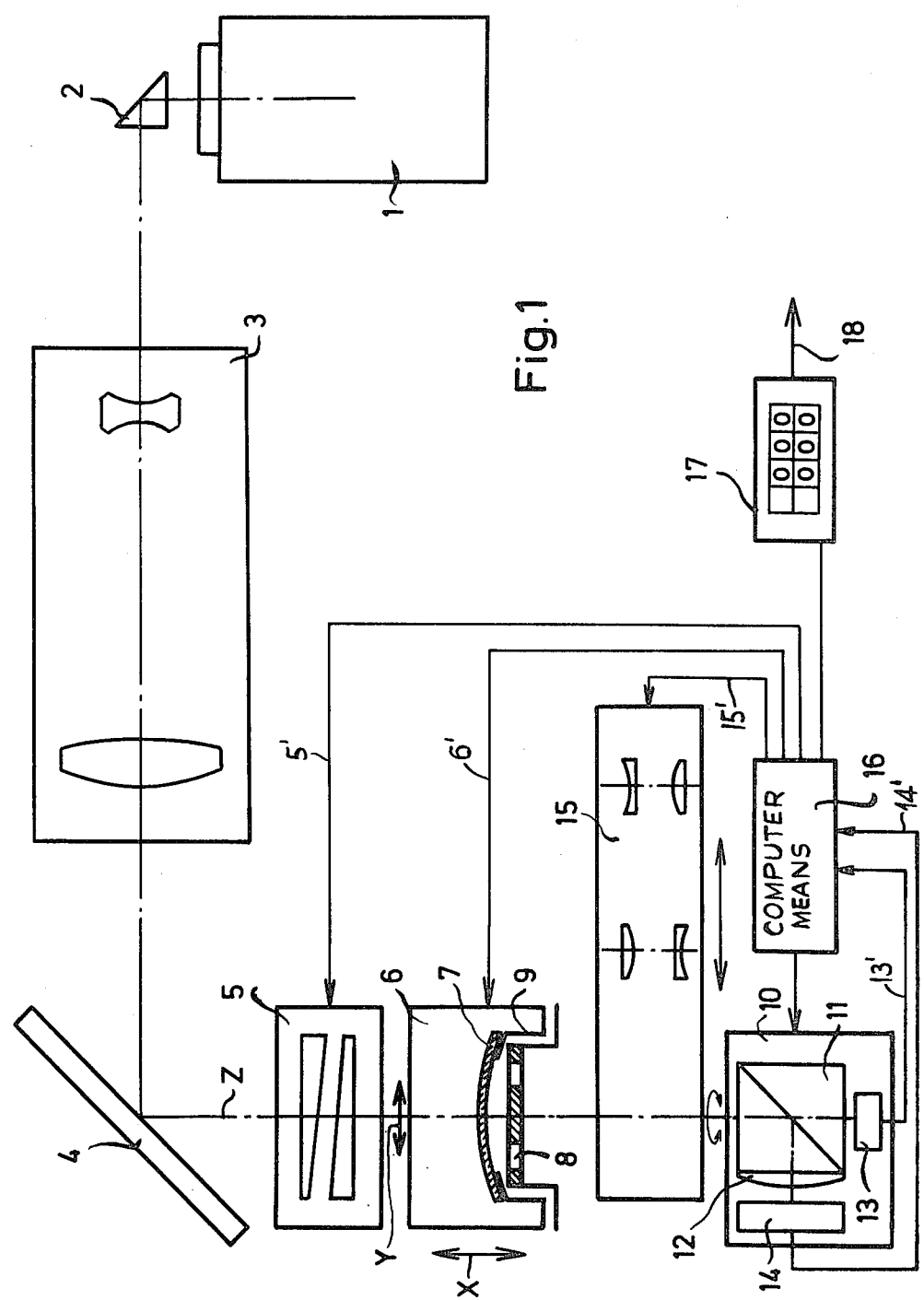
FIG. 1 is a block diagram of an automatic focimeter of the invention.

In the embodiment shown in FIG. 1, a laser 1 supplies monochromatic light for the transilliumination of an object 7 being examined. The laser beam is reflected at a prism 2 and then passes into an expansion optical system 3 in which its diameter is changed in such a manner that the resulting ray bundle provides uniform illumination of an annular stop 8.

After reflection at a mirror 4, the bundle of rays passes through a prism compensator 5. The latter comprises two wedges which are rotatable in opposite directions around the optical axis A; their prismatic effect can therefore be continuously changed, from zero to twice the effect of one wedge.

Thereupon, the parallel-ray bundle strikes the object 7 being examined, which is supported in a mount 9 fastened on a stage 6 which can be displaced in two directions (X, Y) perpendicular to the optical axis. The annular stop 8 is on the eye-side of the object 7; and stop 8 is projected, reduced or enlarged, depending on the collecting or dispersing action of the object 7 being examined, to the plane containing self-scanning photodiode lines 13 and 14.

In the ray path between stop 8 and diode lines 13 and 14 is a beam splitter 11 which effects a doubling of the plane in which the diode lines are arranged.

A lens 12 is cemented to one of the exit surfaces of the beam splitter 11, thereby effecting a constant difference in the projected figure, with respect to the two diode lines. This difference is utilized in order to recognize the existence of a projected figure which exceeds the measurement range, towards positive diopters.

A computer 16 continuously processes information concerning the position of the four centroids of the light distribution on the diode lines; connection lines 13'-14' from the respective diode lines 13-14 to the computer 16 will be understood to schematically indicate such computer-coordinated processing. After effecting prism compensation, measurement-range selection and centering in accordance with X and Y, the computer 16 calculates vertex refractive powers, from the observed offset distances of the intercepts of these centroids on the corresponding diode lines. The refractive powers are made visible in a display unit 17 and compared with predetermined values. In case of differences which lie outside the tolerance range, a signal 18 is produced which, after further processing, can serve for sorting out the object 7 being examined.

Figure 2A:
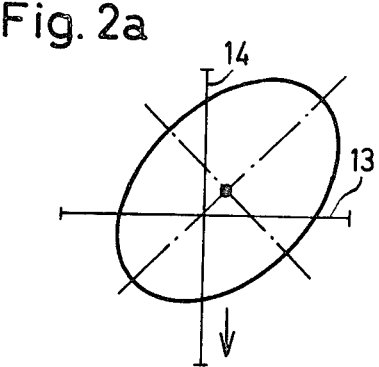
FIGS. 2a to 2e are diagrams to show different positions of a projected figure on the diode lines, as the same appears at different stages in the course of centering the object being examined.

The procedure for centering and for obtaining the measurement value will be described in further detail below:

After the object 7 to be examined has been placed on the mount 9 and has been transilluminated with light from the laser 1, and after correct measurement-range selection, the projected figure (ellipse) shown in FIG. 2a is produced in the plane of the diode lines 13-14; the principal axes of this figure assumes a random position with respect to the diode system. From observation of the difference between the length of the principal axes and the diameter of the annular stop, there are obtained two values which are proportional to the vertex powers, but to make this observation, the principal axes of the projected figure must be caused to coincide with those of the diode system. This is done by logic circuits which: recognize the asymmetrical position of intercept points, determine the intersection of the projected figure with the diode system, and activate a motor which displaces the stage 6 which carries the mount 9 for the object 7 to be examined in such manner that the condition of symmetry is satisfied, i.e., the center of symmetry of the projected figure then coincides with the point of intersection of the diode lines (FIG. 2c). It will be understood that the line 6' from computer 16 to stage 6 schematically indicates such motor-driven control of stage 6, in the coordinate directions X-Y. It will be understood that the same effect is obtained if, instead of balancing for the condition of symmetry, the balancing criterion seeks maximum distance apart of the two points of intersection of the projected figure with each of the respective diode lines.

If the inserted object to be examined happens not to be oriented in accordance with its principal planes, then the step of centering in the plane (X, Y) perpendicular to the optical axis is followed by partial rotation of the part 10 containing the beam splitter 11 and the diode lines 13-14. The position in which the principal axes coincide with the axes of the diode system is recognized from the maximum difference then present in the distances away of the intercept points of the projected figure on the individual diode lines. The measurement values a, a' and b, b' respectively correspond to these positions (see FIGS. 2d and 2e) and differ by a constant difference, attributable to the lens 12. A circuit in the computer 16 notes from the sign of this difference whether an image reversal, i.e. an exceeding of the measurement range towards excessively high refractive powers, is present.

A "measurement-range exceeded" signal is used to swing supplementary lens systems 15 into the ray path between the object 7 being examined and beam splitter 11, thereby effecting through such optical systems an expansion of the measurement range or an offsetting displacement of the measurement range, as the case may be; the computer connection line 15' will be understood to schematically indicate control and motorized means to accomplish such displacement, for changing the optical system.

Figure 2B:
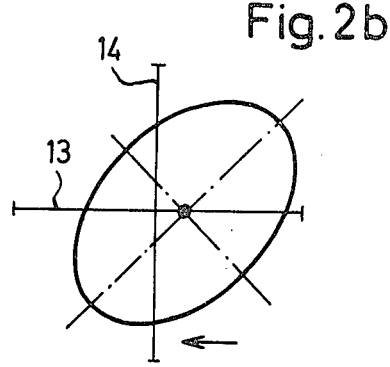
Figure 2C:
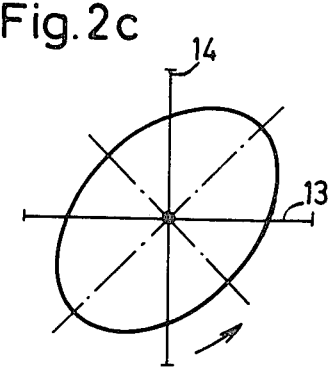
Figure 2D:
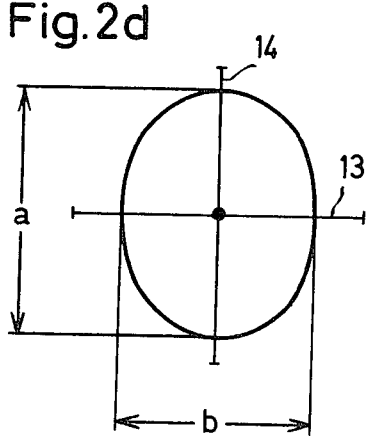
Figure 2E:
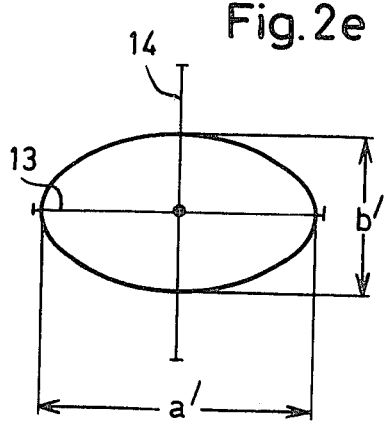

If the object 7 has a prismatic effect, then it is not possible to center it in X and Y, as sketched in FIGS. 2a and 2b, by means of the stage 6. In such case, the prism compensator 5 must be used, in order to correct the asymmetric position of the projected figure. The positions of the wedges of the compensator 5 are reported back to the computer after balancing and are fed, after suitable reshaping, to the display unit 17. Again, this is a computer-controlled motor-driven operation, as suggested schematically at 5'.

For the method of the invention for the automatic digital measurement of vertex powers, it is not necessary in all cases to use two crossed diode lines in order to measure the picture of the projected figure. With a somewhat greater expense in measurement time and evaluation electronics, centering and measuring of the projected figure is also possible with only a single diode line. If it is assumed that the diode line 14 in FIG. 2 is absent, then a centering of the ellipse of FIG. 2a takes place as follows: First of all, the stage 6 on which the object to be examined is fastened is moved in such a manner that the projected figure passes over it perpendicularly to the direction of the diode line 13. If the distance between the centroids of the illuminated diode groups is maximum, the first movement is stopped and a symmetrical illumination is brought about by a second movement in the direction of the diode line 13. Thereupon, the principal axes of the projected figure can be measured one after the other by partially rotating the diode-line part 10 (or the object being examined) about the optical axis.

Instead of rotating the detector of the object being examined, an image-turning prism can be arranged for rotation about the optical axis, the same being located in the ray path between the object being examined and the diode line 13. Such a prism may be rotated with constant speed, for instance continuously, and also during the centering process. The resultant alternating-voltage signals of the diode line can then be used for range selection, adjustment and calculation of measurement value.

Instead of rotary displacement after centering the object 7 and subsequent measurement of the principal axes of the projected figure, a measurement method operating without rotation can also be used. In this case, the projected figure is moved by a linear movement, either of the line 13 or of the object being examined, perpendicular to the optical axis and to the directional alignment of the diode line 13. This movement can be so adapted to the reading rate of the diode line that the number of measurement values entered in the computer 16 allows the shape of the projected figure to be determined with desired resolution. From the pairs of values for the parallel planes through the projected figure, the computer 16 calculates the angular position and length of the principal axes. This non-rotating method requires a somewhat higher expenditure for evaluation and storage electronics than the one previously described in which the measurement is effected in the principal axes of the projected figure.

When dimensioning the apparatus, the diameter of the annular stop 8 can be so selected that it—i.e., its projected image—without influence from the object being examined (i.e., zero diopters) amounts to half a diode-line length. There is then obtained an unequivocal measurement range which is of the same size for positive and negative diopters. If it is desired to cover with it a range of about 25 diopters, one then obtains, when using ordinary commercial diode lines (512 diodes), an apparatus resolution of 0.1 diopter, which value is sufficient for most applications. A higher resolution can be obtained by longer diode lines, having for instance 1024 elements, or by a sub-division of the measurement range into smaller individual ranges, the changing of which is effected by swinging a supplementary lens system into the ray path.

If the stop diameter is selected equal to the detector-line length and if one arranges directly behind the stop 8 a collecting lens whose focal point coincides with the point of intersection of the diode lines 13-14, then, with the same resolution of 0.1 diopter, there is obtained a doubled measurement range of about 50 diopters. The information with regard to the sign of the refractive power of the object 7 being examined can, in this connection, be recognized by an arrangement (equivalent to the one described above) of a supplementary lens 12 for the diode line 14 to indicate whether the measurement range has been exceeded.

If objects to be examined which consist of different glass material are measured by the method of the invention, the error which must possibly be taken into consideration is that which is caused by the different dispersion of the glasses in combination with the deviation of the wavelength of the laser from the centroid of the spectral sensitivity of the eye. If the dispersion of the material is known in each case it can be used, after the introduction thereof into the computer, for the correction of the measurement values. However, it is also possible to use a laser which is adapted to the centroid of the spectral sensitivity of the eye.

What is claimed is:

1. A method for automatic digital measurement of vertex dioptric powers in the principal planes of toric spectacle lenses, wherein the spectacle lens (7) to be measured is transilluminated by a parallel-ray bundle of monochromatic light, wherein the light bundle which passes through the spectacle lens is limited by a stop (8) in the immediate vicinity of the spectacle lens vertex and is directed onto at least one self-scanning diode line (13, 14), wherein signals produced by the diode line (13, 14) are used to obtain a digital measurement value, and wherein the light which passes through the spectacle lens and the stop is divided by a beam splitter (11) into two individual light beams such that each of the resulting two individual light beams falls onto a different one of two diode lines (13, 14), which diode lines together form a coordinate system.

2. A method according to claim 1, characterized by the fact that a rotational movement between the spectacle lens (7) and the diode lines (13, 14) is effected about the optical axis which passes through the spectacle lens.

3. A digital focimeter for making automatic digital measurement of vertex dioptric powers in the principal planes of toric spectacle lenses, wherein a spectacle lens to be measured is transilluminated by a parallel-ray bundle of monochromatic light, wherein the light bundle which passes through the spectacle lens is limited by a stop in the immediate vicinity of the spectacle lens vertex and is directed onto at least one self-scanning diode line, and wherein signals produced by the diode line are used to obtain a digital measurement value, said focimeter being characterized by the facts: that a laser (1) is used as the source of light; that behind the laser a beam expander (3) is arranged to produce an enlarged parallel-ray bundle; that the eye side of the spectacle lens (7) is arranged adjacent an annular stop (8) positioned in the parallel ray path; and that a beam-splitter prism (11) is arranged in the path of light which passes through the spectacle lens (7) and the annular stop (8); and that, separate diode lines (13, 14) are arranged behind the respective light-exit surfaces of said prism.

4. A digital focimeter according to claim 3, characterized by the fact that the beam-splitter prism (11) is rotatable together with the diode lines (13, 14) about the axis of light entering the prism.

5. A digital focimeter according to claim 3 or claim 1, characterized by the fact that a supplementary lens (12) is arranged on only one of the light-exit surfaces of the beam-splitter prism (11).

6. A digital focimeter according to claim 3, characterized by the fact that a prism compensator (5) is arranged in the path of the bundle parallel rays in front of the spectacle lens (7).

7. A digital focimeter according to claim 3, characterized by the fact that interchangeable optical imaging systems (15) for the preselection of the measurement range are arranged between the spectacle lens (7) and the beam-splitter prism (11).

8. A digital focimeter according to claim 3, characterized by the fact that the spectacle lens mount (9) is arranged on an X-Y stage (6).

9. A digital focimeter according to claim 8, characterized by the fact that the stage is displaceable by motor drive responsive to a function of the centering signal of the diode lines (13, 14).

10. A digital focimeter for digital evaluation of vertex dioptric power in the principal planes of a given toric spectacle lens, comprising: a laser source of coherent monochromatic light have an optical axis; an annular stop centered on said axis and defining a circular slit; an expansion optical system between said source and said slit for enlarging the beam of laser light to a parallel-ray light bundle of sufficient size to cover said slit; means for supporting an inserted spectacle-lens object on said axis between said expansion optical system and said stop, with said stop located on the eye side of the object; whereby, at a plane normal to said axis and behind said stop, an elliptical light figure is projected and is viewable; beamsplitting means interposed between said plane and said stop and having first and second outputs through which said light figure is viewable in separate planes; and a self-scanning photodiode line positioned in each of said planes, said photodiode lines oriented through the axis of the applicable one of said outputs and in directions to scan different pairs of intercepts with the light figure.

11. A digital focimeter for digital evaluation of vertex dioptric power in the principal planes of a given toric spectacle lens, comprising; a source of monochromatic light having an optical axis; an annular stop centered on said axis and defining a circular slit; a beam-expansion optical system between said source and said slit for enlarging the beam of monochromatic light to a parallel-ray light bundle of sufficient size to cover said slit; means for supporting an inserted spectacle lens object on said axis between said expansion optical system and said stop, with said stop located on the eye-side of said object; whereby, at a plane normal to said axis and behind said stop an elliptical light figure is projected and is viewable; beamsplitting means interposed between said plane and said stop and having first and second outputs through which said light figure is viewable in separate planes; and a self-scanning photodiode line positioned in each of said planes, said photodiode lines oriented through the axis of the applicable one of said outputs and in directions to scan different pairs of intercepts with the light figure.

12. The focimeter of claim 10 or claim 11, in which said supporting means includes means for moveably positioning the inserted lens object and stop with respect to the optical axis.

13. A digital focimeter for digital evaluation of vertex dioptric power in the principal planes of a given toric spectacle lens, comprising: a souce of monochromatic light having an optical axis; an annular stop centered on said axis and defining a circular slit; a beam-expansion optical system between said source and said slit for enlarging the beam of monochromatic light to a parallel-ray light bundle of sufficient size to cover said slit; means for supporting an inserted spectacle lens object on said axis between said expansion optical system and said stop, with said stop located on the eye-side of said object; whereby, at a plane normal to said axis and behind said stop, an elliptical light figure is projected and is viewable; first and second self-scanning photodiode lines positioned to scan transverse to said axis for orthogonally related pairs of intercepts with said elliptical light figure; and means, including a reflecting surface interposed between said stop and said photodiode lines, for separately projecting said light figure onto the respective photodiode lines.

* * * * *